United States Patent Office 3,396,289
Patented Aug. 6, 1968

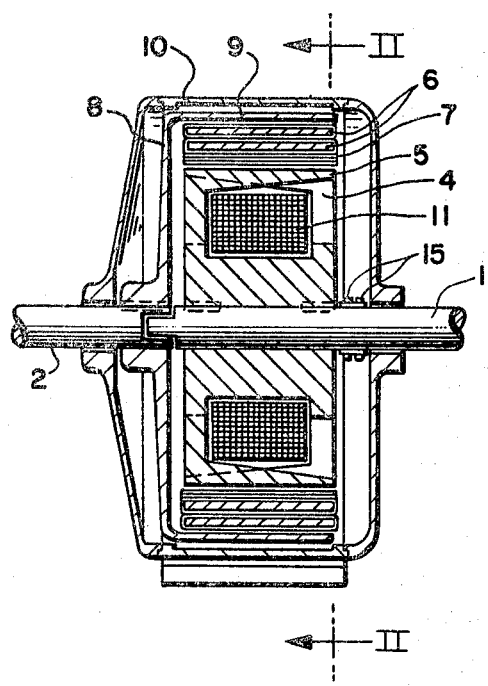
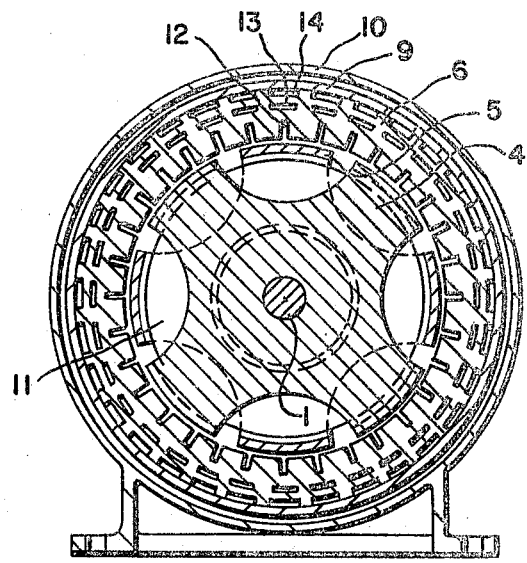
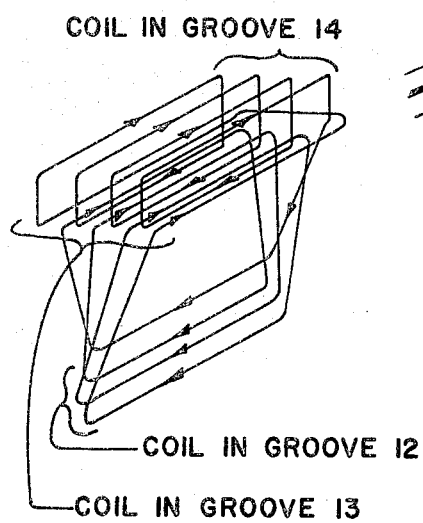
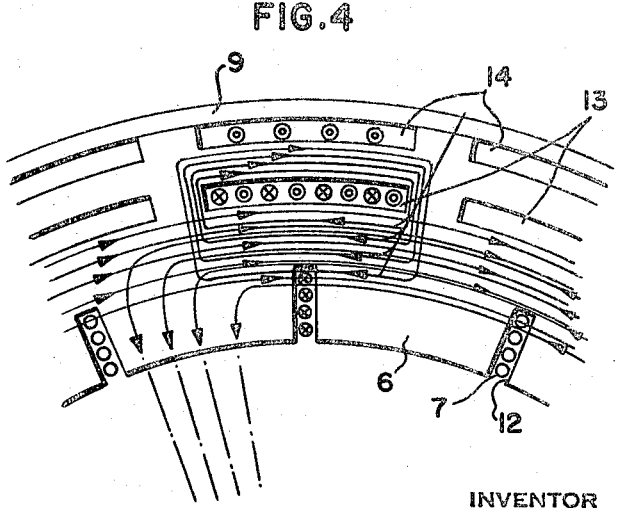

3,396,289
INFINITELY VARIABLE SPEED DRIVE
Enakichi Hayasaka, 13 1-chome, Kaminakazato,
Kita-ku, Tokyo, Japan
Filed July 16, 1965, Ser. No. 472,559
10 Claims. (Cl. 310—92)

ABSTRACT OF THE DISCLOSURE

An infinitely variable speed drive having coaxial input and output shafts. A coil on the input shaft generates a rotating magnetic field, and an armature on the output shaft surrounds the coil and is formed with a circumferential row of windows extending axially therethrough. Series-connected armature windings pass through the windows and respectively over the outer and inner faces of the armature in such a manner that the de-magnetizing effect of the current induced in the armature windings by the rotating magnetic field is neutralized in a region of the armature proximate to the field.

---

The present invention relates to an electrically controlled, infinitely variable speed transmission, and more particularly to a transmission in which power is transmitted from an input shaft to an output shaft by means of dynamo electric principles.

Various speed transmitters utilizing motor-generator principles are known. For example, the eddy current type electromagnetic clutch, or drive, uses a drum rotor in which eddy currents are generated, which interact with a magnetic field associated with an input shaft. Various kinds of drum rotors may be used; some may utilize discrete electrical conductors wound on a core, others squirrel cage type rotors, which may be cast or also wound; and others again in which the iron of the core itself also supplies the current paths. The squirrel cage type rotor is usually not deemed a vary efficient device, due to the losses associated therewith, and the considerable difference in power transmission capabilities as the relative speed between input and output shafts changes. The discrete winding or conductor type of eddy current speed transfer is superior. Torque transmitted is generally in proportion to the relative speed values, and the exciting current of the field associated with the input shaft. The output speed is quite stable, even under variations of load resistance, and such dynamo electric variable speed transmission are widely used. However, in order to obtain good transfer of power, the mechanical side of such apparatus must be comparatively large. In the conductor type, because the magnetic circuit is not entirely closed, the field required to generate sufficient flux is comparatively large, thus requiring the heavy iron construction. In the magnetic conductor type, the magnetic circuit is closed and the flux may be large but also the electrical resistance is high due to the poor conductivity of the magnetic material. The eddy current itself, again due to the poor electrical conductivity is comparatively low with respect to the exciting field, and again, in order to provide for efficient transfer of power, a comparatively large structure is necessary.

It is an object of the present invention to provide a dynamo electric speed changer which has the advantage of the conductor type eddy current device, in that efficient transfer of power is provided, without the disadvantage of large size and substantial magnetic structures.

According to the present invention, the infinitely variable speed drive has a pair of shafts, an input shaft and an output shaft, which preferably are supported to be concentric with respect to each other. The input shaft is provided with a magnetic field generating means, such as a permanent magnet, or a magnetic structure with field coils arranged thereon, which can be excited through currents supplied over slip rings. Control of the current can then vary the relative speed between input shaft and output shaft. An armature structure is associated with the output shaft. In practice, this is best arranged by providing a drum shaped armature surrounding the field and closely spaced therefrom with just a sufficient gap to permit relative rotation. The armature structure has radial slots on the inside face to accept windings; the outside face is likewise provided with slots, which preferably have a greater extent along the circumference rather than penetrate the metal of the armature structure. A third space for windings is provided within the armature structure; this third space is in the form of a window, and provides a magnetic discontinuity within the armature structure itself. A pair of windings are located on the armature; one of the pair is wound from the inside slot through the window, and the other of the pair is wound from the window to the outside slot. The pairs of windings are connected in series, and in such a manner that the currents which are induced in the windings due to relative rotation between the field and the armature will be in opposite directions in the conductors within the window, or magnetic discontinuity. The result of this arrangement is that the de-magnetizing effect with respect to the field, due to the current induced in the windings, will be essentially compensated within the armature in the region between the window and the inside of the armature. Thus, very efficient magnetic coupling of the armature and of the field can be achieved.

In its broadest aspects, thus, the invention provides a means to avoid the de-magnetizing effect of currents induced in the armature. This is accomplished by the special armature structure and the special windings placed thereon.

The structure, organization and operation of the invention will now be described more specifically in the following detailed description with reference to the accompanying drawings, in which:

FIG. 1 shows a cross sectional side view of the infinitely variable speed drive of the present invention;

FIG. 2 is a cross sectional view along line II—II of FIG. 1;

FIG. 3 is a schematic wiring diagram of the armature portion of the speed changer of the present invention; and FIG. 4 is a partial enlarged view of the armature showing current flow in the windings, and magnetic flux lines.

Referring now to the drawings, and particularly to FIGS. 1 and 2, there is shown an input shaft 1, concentric with an output shaft 2, the shafts being journaled within a cylindrical housing 10, as well known in the art. Input shaft 1 has associated therewith a plurality of field poles 4, 5, which may be offset with respect to each other as shown more particularly in FIG. 2. Field coils 11 are secured to the field structure, and supplied by an exciting current over slip rings 15 secured to the input shaft. The output shaft 2 has a drum rotor 6 affixed thereto by means of a spider, or attachment disc 8. Spider or attachment disc 8 is preferably integral with an overlapping rim or case 9. The drum rotor, or armature 6 secured to case 9, is arranged such that it can freely rotate with respect to fields 4, 5, leaving a small air gap therebetween.

Slots or grooves 12 (FIG. 2, FIG. 4) extend axially in the armature structure 6, on the outside periphery thereof that is closest to the axis of rotation defined by shafts 1 and 2. Peripheral grooves or slots 14 are likewise formed on the outer surface of the structure 6 as best seen in FIG. 4.

Interiorly of the armature structure, that is within the armature structure itself, a magnetic discontinuity or window 13 is formed, extending in an axial direction. As best seen in FIG. 4, this window has a much larger extent in the circumferential direction than in the radial direction. Of course it extends throughout the axial length of the armature.

A pair of coils, serially connected as shown best in FIG. 3, are placed in the slots 12, 14, and in window 13. The first coil of the pair is wound in groove 12 and through the window 13 (see FIG. 3). It forms the rotor coil usually associated with a dynamo electric variable speed drive. Serially connected to this first coil is a second one, placed in window 13 and having its return conductors located in axial groove 14 (FIG. 3, FIG. 4). The connection of the two windings (see FIG. 3) is such that current flow in the conductors within window 13 is in opposite directions. The number of turns of the first and second winding may be the same, or the number of turns of the second winding, that is, the one linking window 13 and slot 14 may be somewhat larger than that of the winding linking slots 12 and window 13. The exact number of windings, and the sizes of the coils and the wire itself is related to the impedance characteristics and to the speed ranges for which the apparatus is to be designed. The number can be determined readily, as is well known to those skilled in the art, from dynamo electric machine design data.

The material of the rotor may be ordinary motor lamination electrical steel, or castings.

In operation, input shaft 1 is connected to a motor drive, for example, to a synchronous motor. When an exciting current is fed over slip rings 15, a four pole rotating magnetic field 15 is generated within the armature structure 6, causing voltage within the conductor groove 12.

Referring now particularly to FIG. 3 and FIG. 4:

Excitation of the field structure 4, 5 causes a flux $\phi_1$. Upon rotation of the field in a given direction, the voltage induced within the coils in slots 12 and window 13 causes current to flow as indicated in FIG. 4 by conventional symbols. The current flow within the coil causes a counter-magnetomotive force, that is, a flux indicated as $\phi_2$. As well known, and as shown in FIG. 4, flux $\phi_2$ is opposite in direction to flux $\phi_1$, thus greatly reducing the amount of magnetic force linking the rotor field structure 4, 5, and the armature 6.

The same current which flows in the coils linking grooves 12 and window 13 also flows in the coils linking window 13 and groove 14, since the two windings are serially connected. The flux caused by the current in the second coil is shown as $\phi_3$ in FIG. 4. $\phi_3$ since no external magnetic circuit is provided beyond the grooves 14, occurs as shown in FIG. 4. As can clearly be seen in FIG. 4, $\phi_3$ is opposite to $\phi_2$ in the region between grooves 12 and window 13, thus permitting the flux $\phi_1$ to be effective to magnetically link the rotating field structure and the armature. The flux $\phi_3$ is approximately equal to $\phi_2$; by increasing the number of turns of the winding linking window 13 and groove 14, losses and differences in magnetic structure can be compensated. The direction of the flux between window 13 and groove 14 is the same as flux $\phi_2$; however due to the fact that the magnetic circuit tends to be closed through the path of least reluctance, flux return of $\phi_3$ through the path otherwise taken by flux $\phi_2$ will occur, thus resulting in the flux path shown in FIG. 4. The net result is that the flux available from field 4, 5, namely $\phi_1$, remains practically unreduced.

The structure of the present invention has the advantage that only a small field current is necessary, since only a small field is necessary, in order to generate substantial magnetic forces linking the field and the armature structure 6. Thus the torque and power transmission capability of a device of a given size is improved. Furthermore, a wide range of speed of transmission is obtainable with only small changes in exciting current. As the relative speed between input shaft and output shaft increases, the losses of the device of the present invention will also increase; however, by suitable choice of the relative number of turns of the winding as the DC resistance value, this problem can be minimized in accordance with the design criteria developed in the induction motor art.

Comparative test data of various dynamoelectric variable speed drives have shown that the best prior art devices are of the wound, drum rotor type. These devices display a torque of approximately three times that of a simple squirrel cage rotor device. Yet, if the torque to be transmitted is increased substantially, that is by increasing the field, the de-magnetizing effect of the circulating current in the armature also increases substantially. Eventually, a balance is obtained and it has been found that an increase of flux beyond that necessary to start the output shaft, with an initially locked rotor, does not result in an improvement in operating characteristics. In contrast, a structure to the present invention is sensitive to increases in applied field until the saturation value of the magnetic structure between window 13 and slots 12 is reached. Obviously, this is a very high value. The de-magnetizing effect of the current in the wound rotor itself, is practically eliminated.

The losses associated with the present device, due to hysteresis, eddy current in the magnetic structure of the rotor itself, and distortion of the magnetic field, can be minimized by utilizing known design techniques in connection with induction motors. Deep grooves, utilization of a double cage type, extensive and careful lamination can be resorted to. The deep grooves, however, result in a poor space factor, and increasing the number of laminations for a given size increases cost. The present invention permits the utilization of less costly material, or less costly assembly, due to the generation of a strong magnetic field within the armature structure. The counter-magnetomotive force due to the armature reaction is counteracted so that no de-magnetizing effect results.

In structures for transformation of electrical energy from one form (voltage, or current) to another, for example in tansformers, the magnetic flux within the transformer itself is a necessary component of the transformation. In the case of speed change or speed adjusting apparatus, however, the magnetic flux is present only as an aid, and the transformation is from rotating power to rotating power; thus, the action of the flux itself is not strictly necessary and any tendency within the structure which introduces losses due to the flux decreases the efficiency of the mechanical energy transfer. Reactive flux, caused by current induced in the armature winding, is thus undesirable in dynamo electric speed apparatus. The present invention provides a solution to the de-magnetizing effect of armature reaction in stepless dynamo electric speed changers.

What is claimed is:

1. An infinitely variable speed drive comprising, in combination:
   (a) an input shaft defining an axis;
   (b) an output shaft capable of rotating with a speed different from that of said input shaft;
   (c) means generating a rotating field associated with said input shaft;
   (d) an armature structure associated with said output shaft to rotate therewith, said armature structure being formed with magnetic discontinuities intermediate said structure in a radial direction; and
   (e) a pair of windings on said armature structure, a first winding of said pair having conductors extending from a region close to said axis to said magnetic discontinuity and a second winding having conductors extending from a region remote from said axis to the magnetic discontinuity, said windings being connected in series in such a manner, that the current through the conductors in said magnetic discontinuity flow in opposite directions.

2. A drive as set forth in claim 1, wherein said armature structure is drum shaped and surrounds said field; the magnetic discontinuity is a window formed in said armature structure; slots are formed in the inner and outer surfaces of said drum shaped armature structure, said first winding being located in the inner slots and extending into and through said magnetic discontinuity and said second winding being located in said outer slots and said magnetic discontinuity.

3. A drive as set forth in claim 1, wherein said first winding encircles a region of said armature structure proximate to said means generating a magnetic field and said second winding encircles a region of said armature structure remote from said means generating the magnetic field.

4. A drive as set forth in claim 3, wherein the turns of said windings are similar in number.

5. A drive as set forth in claim 3, wherein the number of turns of said second winding is greater than the number of turns of said first winding.

6. A drive as set forth in claim 1, wherein said magnetic discontinuity is an elongated window extending in an axial direction and having a circumferential dimension greater than its radial dimension.

7. In an infinitely variable speed drive, in combination:
  (a) an input shaft defining an axis;
  (b) an output shaft;
  (c) means coupled to said input shaft and generating a rotating field when said input shaft rotates about its axis;
  (d) an armature structure coupled to said output shaft and magnetically coupled to said field by an air gap to permit relative rotation of said shafts; and
  (e) coil means associated with said armature structure and electromagnetically coupled to said field to have current induced therein upon rotation of said field, said coil means being arranged such that de-magnetizing effect of said induced current with respect to said field is neutralized in a region of said armature structure proximate to said field.

8. In a drive as set forth in claim 7, said coil means comprising a pair of serially connected windings, one winding of said pair encircling a region of said armature structure proximate to said field and the other winding of said pair encircling a region of said armature structure remote from said field.

9. In a drive as set forth in claim 8, said armature structure being drum shaped and surrounding said field, and being formed with a window extending in an axial direction said window being located intermediate the thickness of said armature structure in a radial direction, and the windings of said pair having conductors located in said window and connected so that current flows through said conductors in said window in opposite direction.

10. In a drive as set forth in claim 9, the other winding of said pair having return conductors located at the outside of said armature structure.

References Cited
UNITED STATES PATENTS

| | | | |
|---|---|---|---|
| 2,908,834 | 10/1959 | Munson | 310—105 |
| 2,911,550 | 11/1959 | Bessiere | 310—93 |
| 3,054,006 | 9/1962 | Bancroft | 310—92 |
| 3,167,674 | 1/1965 | Woodward | 310—105 |

ROBERT K. SCHAEFER, *Primary Examiner.*

H. O. JONES, *Assistant Examiner.*